United States Patent
Espaillat et al.

(10) Patent No.: US 12,451,991 B2
(45) Date of Patent: Oct. 21, 2025

(54) FUNCTIONAL SAFETY IN A BATTERY MANAGEMENT SYSTEM

(71) Applicant: SENSATA TECHNOLOGIES, INC., Attleboro, MA (US)

(72) Inventors: Luis Espaillat, North Attleboro, MA (US); Jonathan M. Rigelsford, Sheffield (GB); Jing Deng, Belfast (GB)

(*) Notice: Subject to any disclaimer, the term of this patent is extended or adjusted under 35 U.S.C. 154(b) by 550 days.

(21) Appl. No.: 17/916,478

(22) PCT Filed: Apr. 16, 2021

(86) PCT No.: PCT/US2021/027617
§ 371 (c)(1),
(2) Date: Sep. 30, 2022

(87) PCT Pub. No.: WO2021/216359
PCT Pub. Date: Oct. 28, 2021

(65) Prior Publication Data
US 2023/0155727 A1   May 18, 2023

Related U.S. Application Data

(60) Provisional application No. 63/014,438, filed on Apr. 23, 2020.

(51) Int. Cl.
*B60L 53/66* (2019.01)
*B60R 16/023* (2006.01)
(Continued)

(52) U.S. Cl.
CPC .......... *H04L 1/0057* (2013.01); *B60R 16/023* (2013.01); *H01M 10/48* (2013.01);
(Continued)

(58) Field of Classification Search
CPC .............................. H01M 10/48; B60L 53/66
(Continued)

(56) References Cited

U.S. PATENT DOCUMENTS

2019/0242949 A1* 8/2019 Lemkin ................ H01M 10/42
2022/0255144 A1* 8/2022 Okano ................ G06F 16/2379

FOREIGN PATENT DOCUMENTS

WO    2007076284 A2    7/2007

OTHER PUBLICATIONS

International Search Report and Written Opinion, PCT/US2021/027617, Aug. 9, 2021, 12 pages.

* cited by examiner

*Primary Examiner* — Nathaniel R Pelton

(57) ABSTRACT

In a particular embodiment, functional safety in a battery management system includes a network controller of a battery management system (BMS) receiving from a module monitoring system (MMS) of the BMS, a message that includes a first set of data type blocks. In this embodiment, the network controller determines for the first set of data type blocks, a block sequence order that indicates a position of each data type block within the message. The network controller determines whether the message conforms with a predetermined block sequence protocol. In response to determining that the message does not conform with a predetermined block sequence protocol, the network controller determines that data within the message is stale.

20 Claims, 15 Drawing Sheets

(51) Int. Cl.
*H01M 10/48* (2006.01)
*H04L 1/00* (2006.01)
*H01M 10/42* (2006.01)

(52) U.S. Cl.
CPC ............... *H01M 2010/4271* (2013.01); *H01M 2010/4278* (2013.01)

(58) Field of Classification Search
USPC .......................................................... 320/109
See application file for complete search history.

FUNCTIONAL SAFETY IN A BATTERY MANAGEMENT SYSTEM

BACKGROUND

Electric vehicles are powered by high voltage battery systems including multiple cells. Battery management systems are used to monitor various attributes of the cells, including voltage, temperature, and current, in order to ensure proper and safe operation of the battery. In a conventional wired battery management system, multiple cells of the battery are grouped into modules, with each module having a component to monitor these attributes. Each of these components is wired to a central controller. Problems caused by this solution include lack of flexibility in pack design, wasted space due to connectors and cabling inside the battery pack, and increased challenges for battery second life usage. Though wireless technologies may be used to connect battery monitoring components to a central controller, these wireless technologies are vulnerable to interference from other systems or malicious parties and are also vulnerable to cyber-attacks.

SUMMARY OF INVENTION

Methods, systems, apparatuses, and computer program products for functional safety in a battery management system are disclosed. In a particular embodiment, functional safety in a battery management system includes a module monitoring system (MMS) of a battery management system (BMS), generating battery sensor data and using a block sequence protocol to generate a message that encodes the battery sensor data. A block sequence protocol is a data structure that defines a pattern, order, or otherwise sequence in which data type blocks within the message are arranged. A message may include a plurality of different types of data (e.g., Slow Data, Fast Data, Diagnostic Data, Fault Data, Status Data, etc.). Each of these different types of data may be encoded within the message as a specific type of data type block. In this embodiment, the MMS further generates a message by determining a first set of data type blocks to include in the message and determines for the message, a block sequence order of the first set of data type blocks. A block sequence order for a particular message is the order in which each data type block is positioned within a particular message. For each data type block of the first set of data type blocks, the MMS selects, within a block sequence order, a position for the data type block that is different than a previous position of the data type block within a previous block sequence order of a consecutively preceding message. In this embodiment, the MMS generates the message with each data type block of the first set of data type blocks positioned according to its selected position within the determined block sequence order. After positioning the data type blocks according to the block sequence order that is determined according to the block sequence protocol, the MMS sends the message to a network controller of the BMS.

In a particular embodiment, functional safety in a battery management system includes a network controller of a battery management system (BMS) receiving from a module monitoring system (MMS) of the BMS, a message that includes a first set of data type blocks. In this embodiment, the network controller determines for the first set of data type blocks, a block sequence order that indicates a position of each data type block within the message. The network controller determines whether the message conforms with a predetermined block sequence protocol. In response to determining that the message does not conform with a predetermined block sequence protocol, the network controller determines that data within the message is stale.

In a particular embodiment, functional safety in a battery management system includes a module monitoring system of the battery management system generating battery sensor data and generating a message encoding the battery sensor data. In this example, an ordering of data types for the message is different from a consecutively preceding message. Continuing with this example, the module monitoring system sends the message, via a wireless black communication channel, to a wireless network controller of the battery management system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DESCRIPTION OF EMBODIMENTS

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e., only A, only B, as well as A and B. An alternative wording for the same combinations is "at least one of A and B". The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1A:
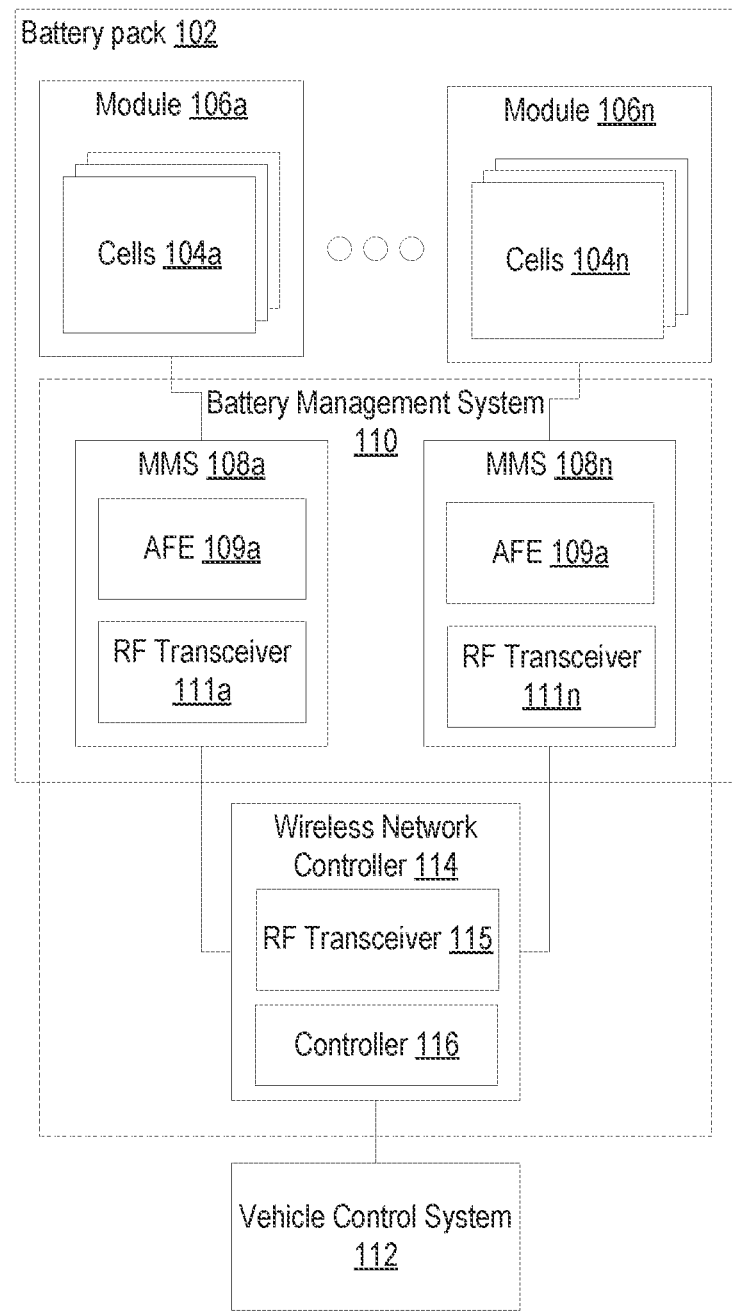
FIG. 1A sets forth a block diagram of a system for functional safety in a battery management system according to at least one embodiment of the present invention.

Exemplary methods, systems, apparatuses, and computer program products for functional safety in a battery monitoring system in accordance with the present disclosure are described with reference to the accompanying drawings, beginning with FIG. 1A. FIG. 1A sets forth a diagram of a system for functional safety in a battery management system according to at least one embodiment of the present invention. The system includes a battery pack (102), such as a high voltage battery for use in an electric vehicle. The battery pack (102) includes a plurality of cells (104a-n), such as Lithium-ion (Li-ion) cells. The cells (104a-n) are grouped into modules (106a-n) such that each module (106a-n) comprises a corresponding subset of the cells (104a-n). The cells (104a-n) may be physically grouped into modules (106a-n) using a casing, chassis, or other enclosure. The cells (104a-n) may also be logically grouped into modules (106a-n) by virtue of distinct groupings of cells (104a-n) being monitored by a distinct module monitoring system (108a-n), as will be described below.

The system also includes a battery management system (110). The battery management system (110) monitors various attributes of the cells (104a-n) and provides battery sensor data indicating these attributes to a vehicle control system (112). The battery management system (110) includes a plurality of module monitoring systems (MMS) (108a-n). Each MMS (108a-n) is configured to monitor a corresponding module (106a-n) of cells (104a-n). For example, each module (106a-n) may have a MMS (108a-n) attached to a chassis, base, tray, or other mechanism holding the cells (104a-n) of the module (106a-n). Each MMS (108a-n) includes an Analog Front End (AFE) (109a-n) to measure various attributes of the cells (104a-n) of its corresponding module (106a-n). Such attributes may include voltage, current, temperature, and potentially other attributes. The attributes are indicated in battery sensor data generated by the MMS (108a-n).

Figure 1B:
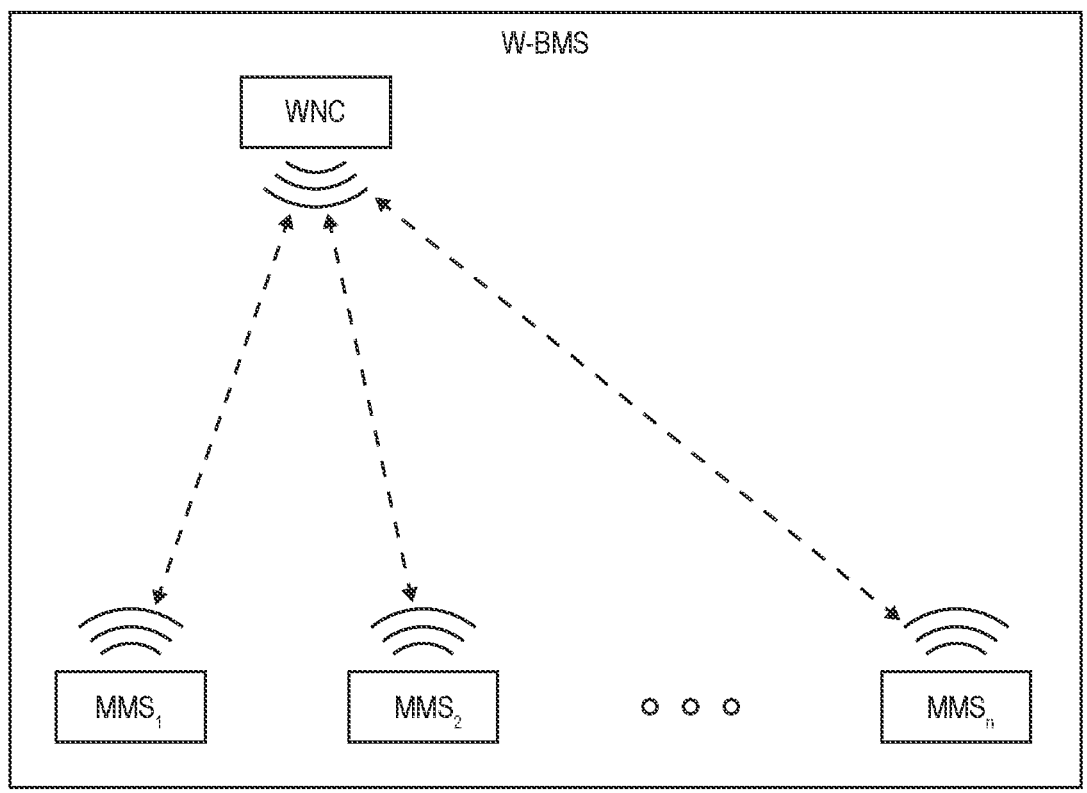
FIG. 1B sets forth a block diagram of a system for communication between a network controller and module monitoring systems according to at least one embodiment of the present invention.

Each MMS (108a-n) encodes its battery sensor data for transmission as a wireless signal and transmits its battery sensor data to a wireless network controller (WNC) (114) (e.g., a 2.4 Ghz wireless channel) via a wireless transceiver (RF transceiver) (111a-n). The WNC (114) includes an RF transceiver (115) to receive the battery sensor data from the MMSs (108a-n) and a controller (116). The WNC (114) then sends the battery sensor data received from the MMSs (108a-n) to a vehicle control system (VCS) (112) using a wired or wireless communications channel. The VCS (112) may include a central "computer" of a vehicle. The VCS (112) may be a central control unit or may refer collectively to one or more vehicle subsystems. A simplified example of communications between a WNC (114) and MMS (108a-n) is shown in FIG. 1B.

Figure 4:
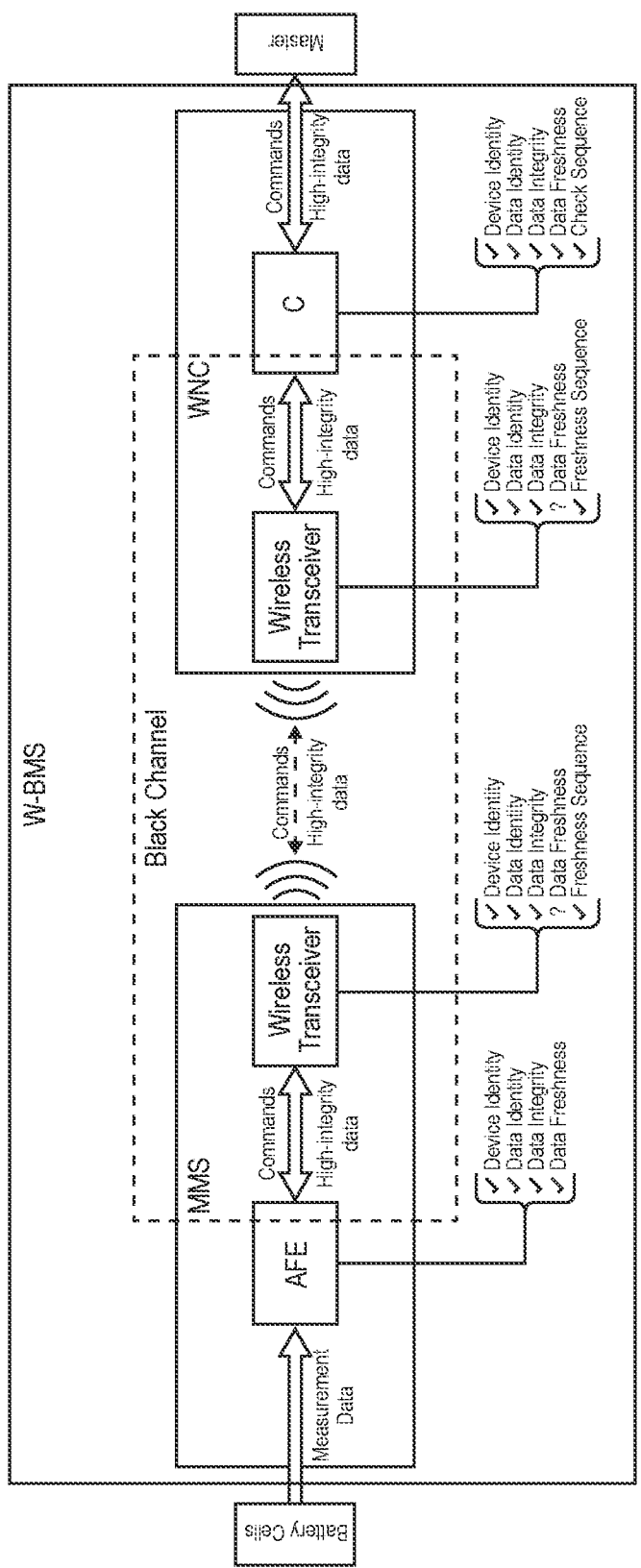
FIG. 4 sets forth a block diagram of a system for functional safety in a battery management system according to at least one embodiment of the present invention.

The data used in the BMS (110) needs to have a high safety integrity level as defined by various functional safety standards (e.g., IEC 61508, ISO 26262, ISO 25119, etc.), therefore the entire signal chain from AFE to µC needs to ensure this level of integrity. To comply with this requirement, the AFE (109a-n) and the controller (116) are required to meet a high integrity level while the RF transceivers (111a-n, 115) can be of a lower integrity level to reduce the design's cost and complexity. Because of this lower integrity on the RF transceivers (111a-n, 115), an end-to-end "black channel" is implemented between the high-integrity components. The wireless black communication channel is considered a "black channel" in that no other devices or channels are used as intermediaries between the RF transceivers (111a-n, 115). An alternative view of this architecture is found in FIG. 4. To ensure the safety integrity is not compromised within the RF transceivers (111a-n, 115), additional mechanisms are needed to implement the "black channel", namely device identity, data identity, data integrity and data freshness.

The AFE (109a-n) provide device and data identity, data cyclic redundancy checks (CRC) for integrity, and data freshness by performing periodical internal diagnostics. However, due to the low integrity on the RF transceivers (111a-n, 115), the freshness of the AFE (109a-n) data can be compromised within them, especially when transmitting the same data type (e.g., voltage, status, faults) on multiple messages.

Figure 5:
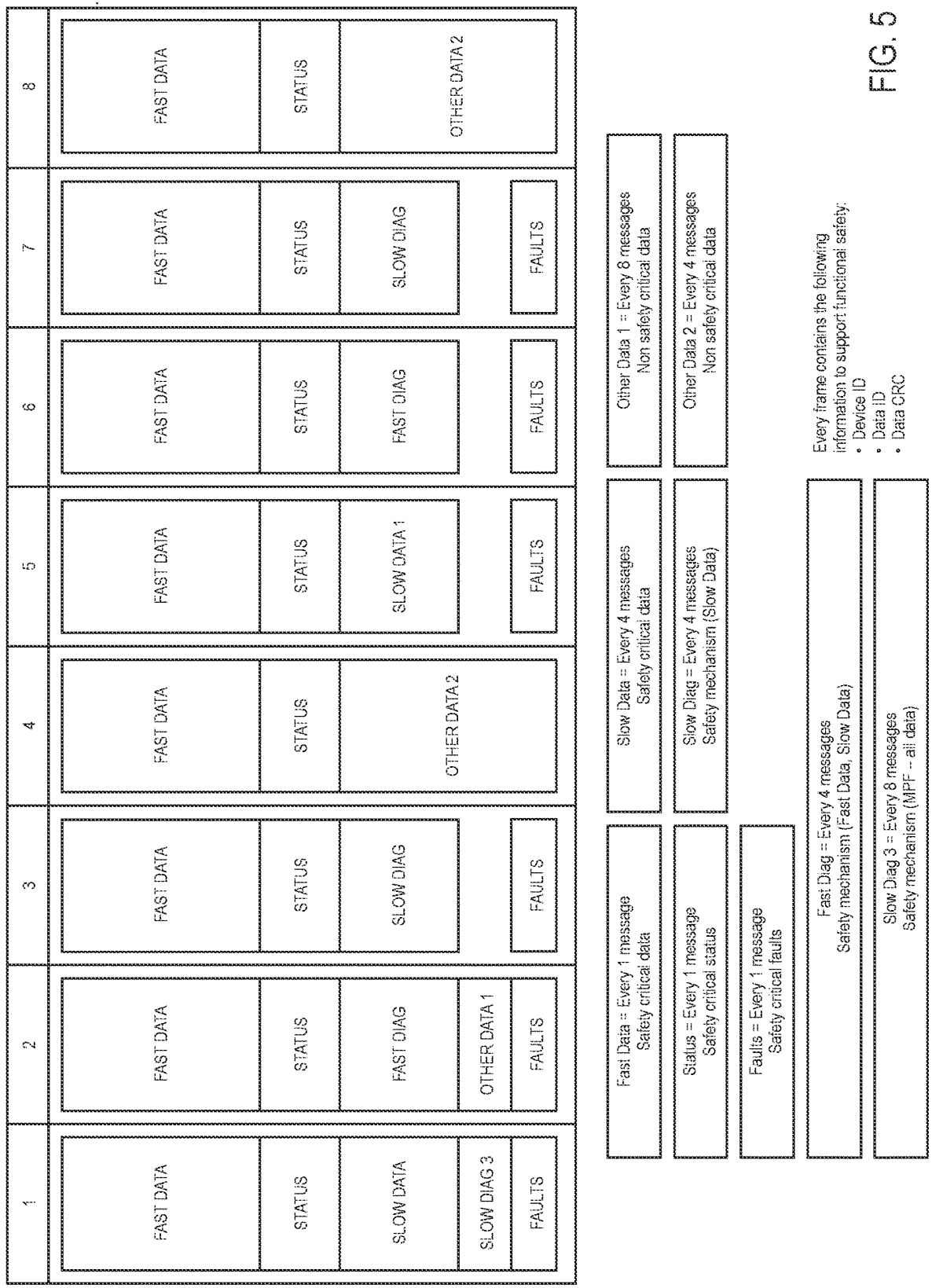
FIG. 5 illustrates an example of data for transmission using the battery management system according to at least one embodiment of the present invention.

To ensure data identity, integrity, and freshness, a message order ensures all necessary data (measurements, information, diagnostics, etc.) is transmitted within the required timing, and that the different data types within the messages are "shuffled" preventing any two consecutive messages from having the same data type in the same position. The message sequence shown in FIG. 5 provides an example of the data that needs to be transmitted (some at higher frequencies than other). Since every data packet contains an ID and CRC, both identity and integrity can be ensured by performing a check/comparison within the Controller (116)

of the WNC (114). However, if a given block of data becomes stale/stuck within the RF transceiver (111*a-n*) of the MMS (108*a-n*), the ID would still be acceptable and the CRC could still be correct, while the data is not fresh anymore.

Figure 6:
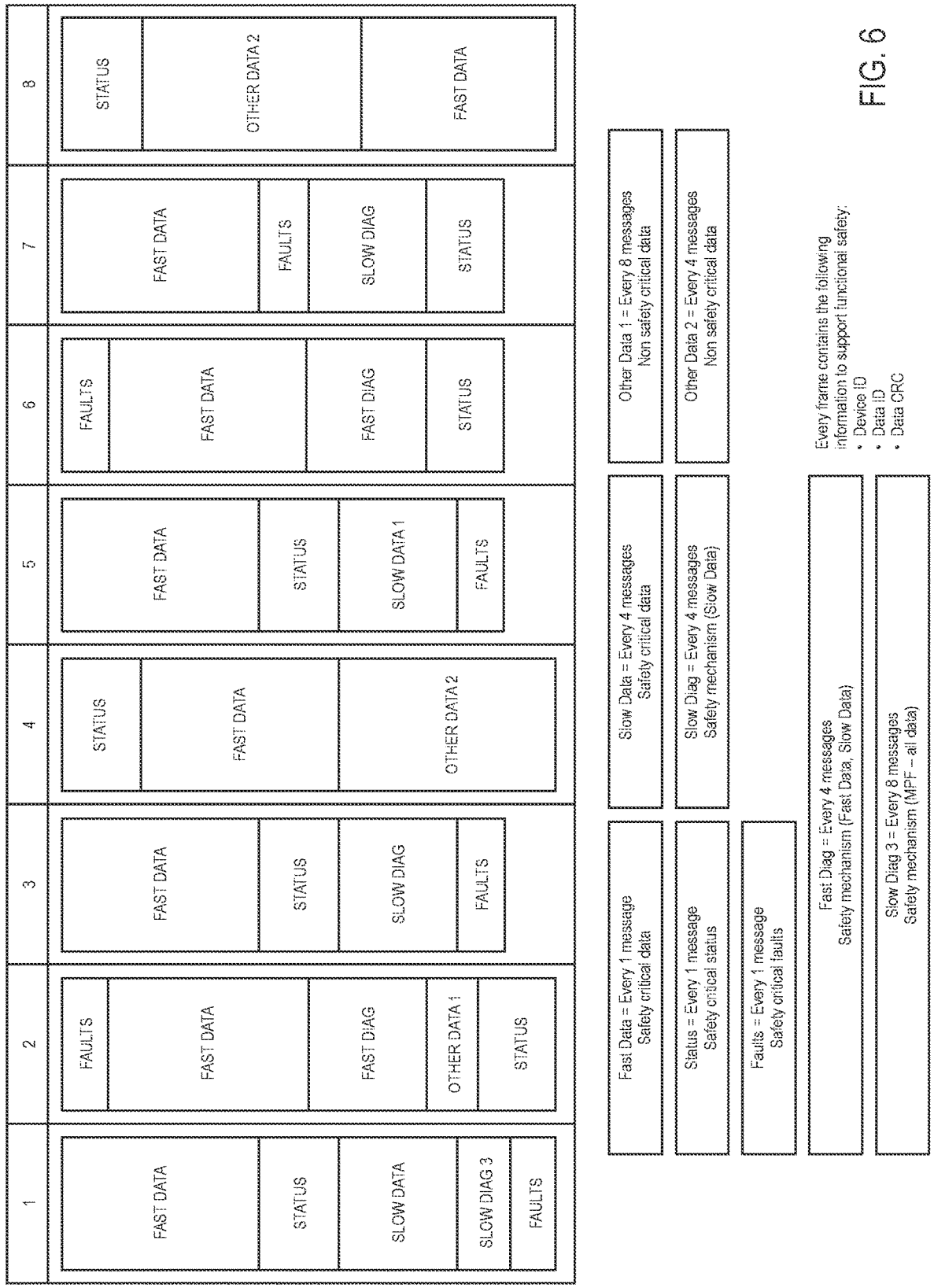
FIG. 6 illustrates another example of data for transmission using the battery management system according to at least one embodiment of the present invention.

This message sequence can be modified by shifting around the data types within each message, such that similar data types don't fall in the same position consecutively. FIG. 6 shows one possible modification of this sequence, where every message is uniquely different from the previous one, and data types do not fall in the same position between any two consecutive messages. This way, if a given block of data becomes stale within the RF transceiver (111*a-n*) of the MMS (108*a-n*), the data order of the new message will cause the CRC of the data to be corrupted once it is checked at the Controller (116) of the WNC (114). The size of the data packets, the length of the message cycle and the additional data provided in the sequence will depend on specific design requirements.

Figure 7:
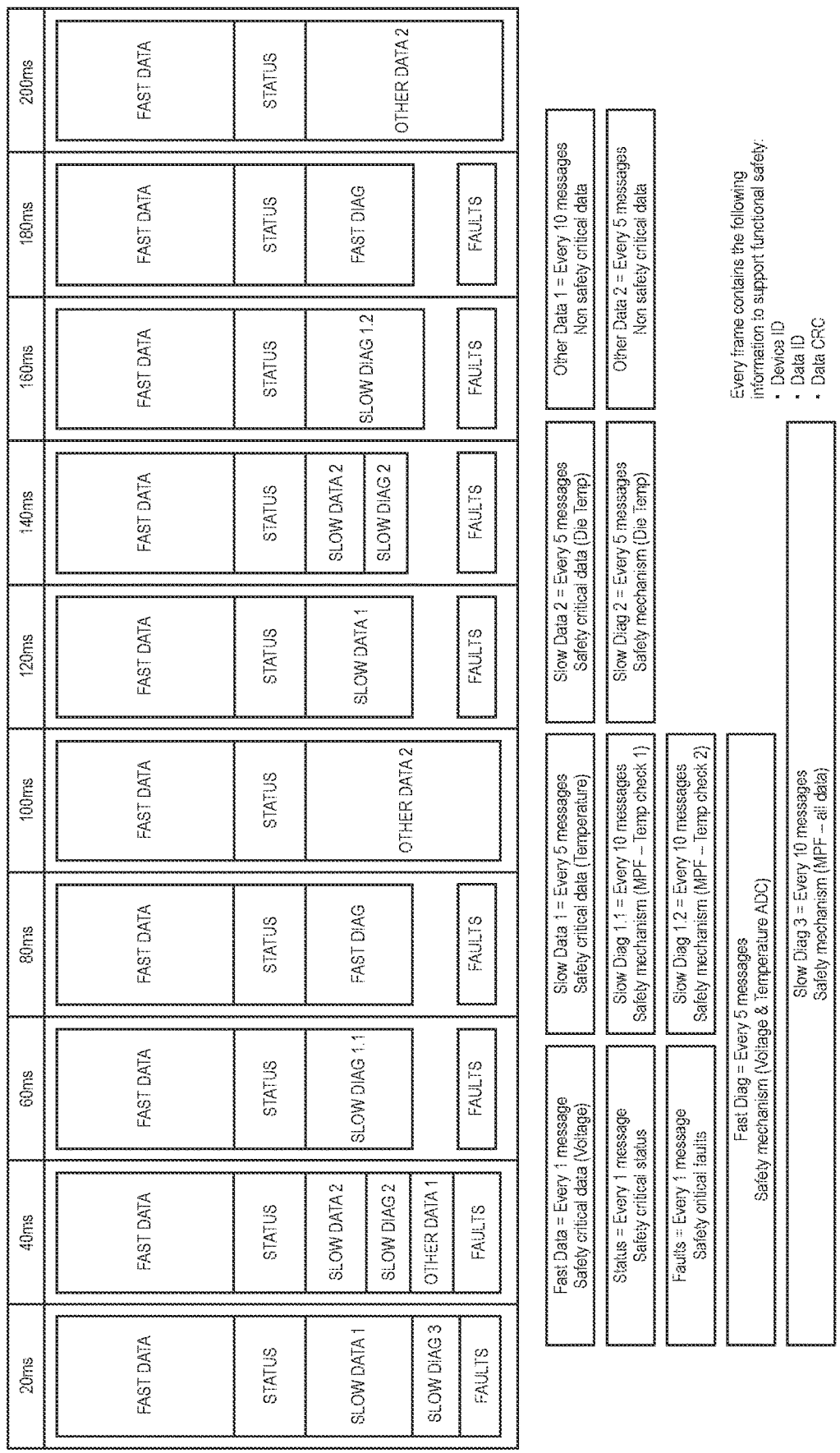
FIG. 7 illustrates another example of data for transmission using the battery management system according to at least one embodiment of the present invention.
Figure 8:
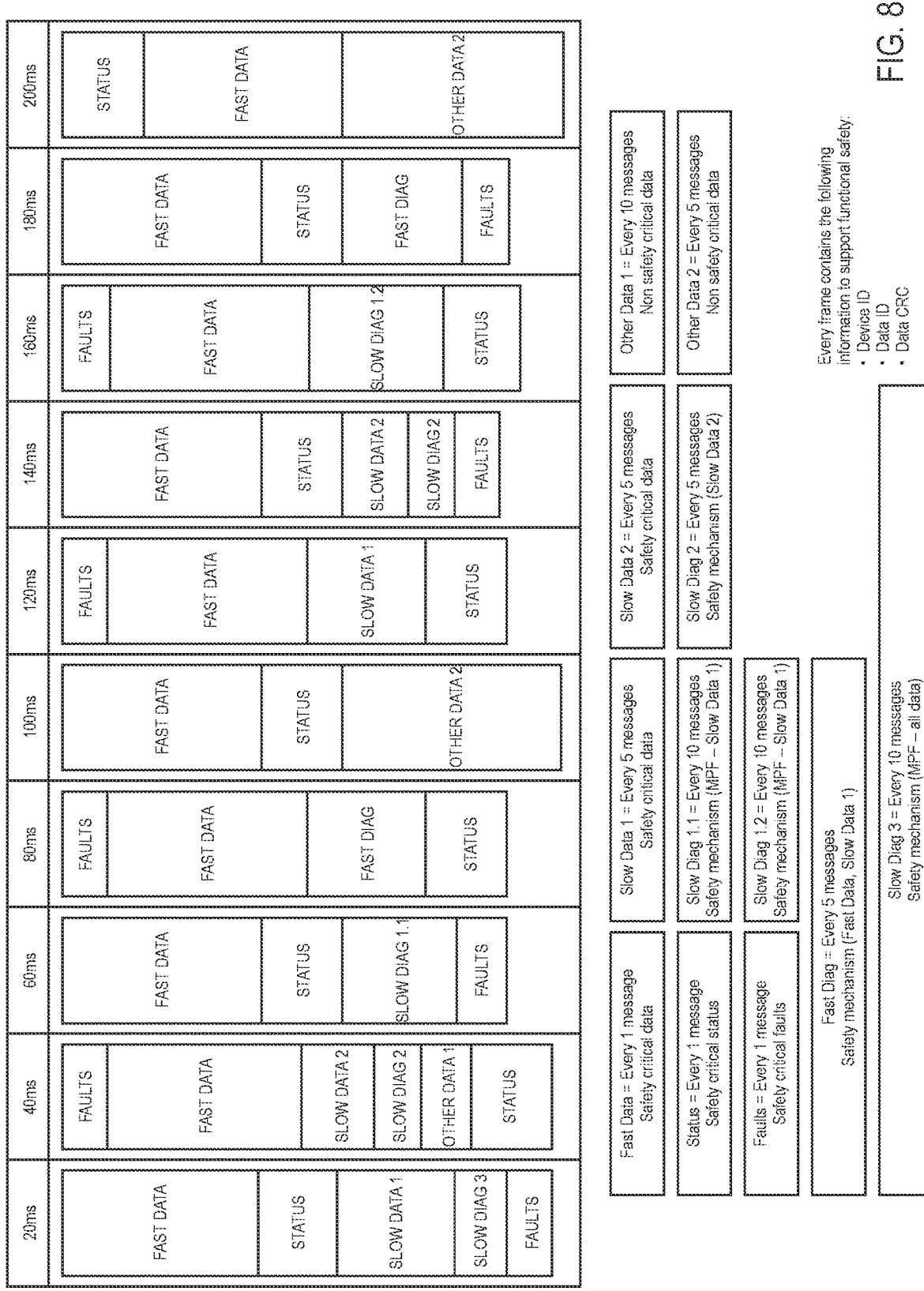
FIG. 8 illustrates another example of data for transmission using the battery management system according to at least one embodiment of the present invention.

For illustration purposes, an example of this sequence was developed for the TI BQ796xx AFE family. These AFEs provide a device address, a register address and a data CRC with every frame, which can be used respectively to ensure device identity, data identity and data integrity by the Controller (116) of the WNC (114). Additionally, the internal diagnostics within the AFE provide coverage for freshness of its output registers, ensuring data freshness with enough safety integrity. However, the same risk remains when appending all the different data types within the low-integrity RF transceiver. The initial sequence applicable to this AFE is shown in FIG. 7.

After shifting around the data packets within the messages, it can be seen in FIG. 6 that each message within the cycle is unique, and that no two consecutive messages have the same type of data in the same position. This means that the Controller (116) of the WNC (114) would be able to detect stale data that comes from the RF transceiver (111*a-n*) of the MMS (108*a-n*).

In order to help the controller (116) detect stale data, the MMS (108*a-n*) may be configured to generate battery sensor data and use a block sequence protocol to generate a message that encodes the battery sensor data. A block sequence protocol is a data structure that defines a pattern, order, or otherwise sequence in which data type blocks within the message are arranged. A message may include a plurality of different types of data (e.g., Slow Data, Fast Data, Diagnostic Data, Fault Data, Status Data, etc.). Each of these different types of data may be encoded within the message as a specific type of data type block.

The MMS (108*a-n*) further generates a message by determining a first set of data type blocks to include in the message and determines for the message, a block sequence order of the first set of data type blocks. A block sequence order for a particular message is the order in which each data type block is positioned within a particular message. For each data type block of the first set of data type blocks, the MMS selects, within a block sequence order, a position for the data type block that is different than a previous position of the data type block within a previous block sequence order of a consecutively preceding message. In this embodiment, the MMS (108*a-n*) generates the message with each data type block of the first set of data type blocks positioned according to its selected position within the determined block sequence order. The MMS (108*a-n*) sends the message to the network controller (116) of the BMS.

The network controller (116) may be configured to determine the freshness of the data received by the MMS (108*a-n*). In a particular embodiment, the network controller (116) receives from the MMS (108*a-n*), a message that includes a first set of data type blocks. In this embodiment, the network controller (116) determines for the first set of data type blocks, a block sequence order that indicates a position of each data type block within the message. The network controller (116) determines whether the message conforms with a predetermined block sequence protocol. In response to determining that the message does not conform with a predetermined block sequence protocol, the network controller (116) determines that data within the message is stale.

Figure 2:
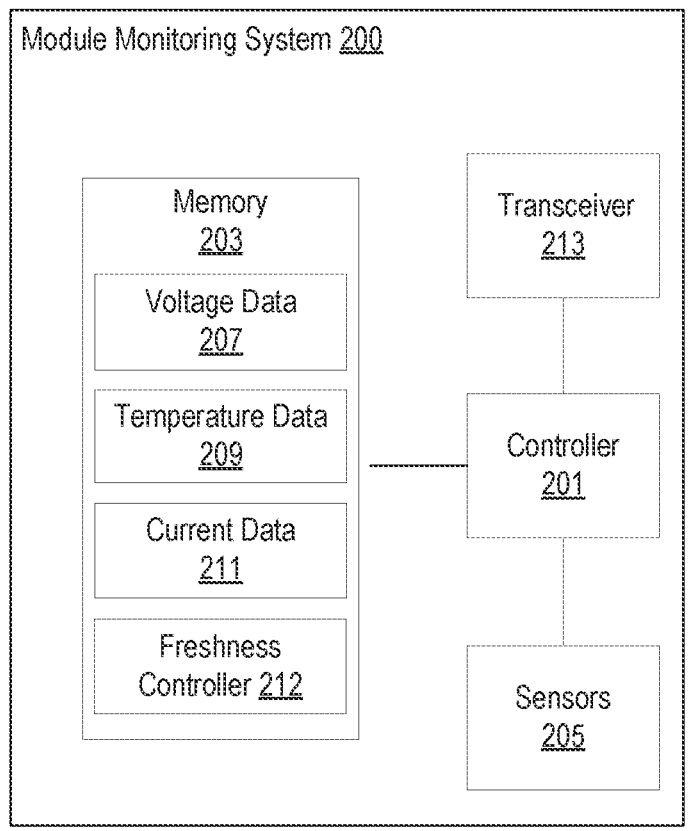
FIG. 2 illustrates a block diagram of a module monitoring system for functional safety in a battery management system according to at least one embodiment of the present invention.

For further explanation, FIG. 2 sets forth a block diagram of a module monitoring system (MMS) (200) (e.g., a module monitoring system (108*a-n*) of FIG. 1) for use in a wireless sensor network having a secure wireless protocol according to at least one embodiment of the present invention. The MMS (200) includes a controller (201) coupled to a memory (203). The controller (201) is configured to obtain sensor readings from sensors (205) (e.g., voltage sensors, temperature sensors, current sensors) to generate battery sensor data (e.g., voltage data (207), temperature data (209), current data (211)). The controller (201) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The battery sensor data (e.g., voltage data (207), temperature data (209), current data (211)) may be stored in the memory (203). The memory (203) may be a non-volatile memory such as flash memory.

The sensors (205) are configured to measure attributes (e.g., voltage, temperature, current) of cells of a module (e.g., cells (104*a-n*) of a module (106*a-n*)) on which the MMS (200) is installed. For bidirectional wireless communication with a wireless network controller (e.g., a WNC (114) of FIG. 1), the MMS (200) includes a transceiver (213) coupled to the controller (201).

In the example of FIG. 2, the memory (203) includes a freshness controller (212) that includes computer program instructions that when executed by the controller (201) cause the controller (201) to perform the operations of: generating battery sensor data; generating, based on a block sequence protocol, a message that encodes the battery sensor data including: determining a first set of data type blocks to include in the message; determining for the message, a block sequence order of the first set of data type blocks including for each data type block of the first set of data type blocks, selecting, within a block sequence order, a position for the data type block that is different than a previous position of the data type block within a previous block sequence order of a consecutively preceding message; and generating the message with each data type block of the first set of data type blocks positioned according to its selected position within the determined block sequence order; and sending the message to a network controller of the BMS.

Figure 3:
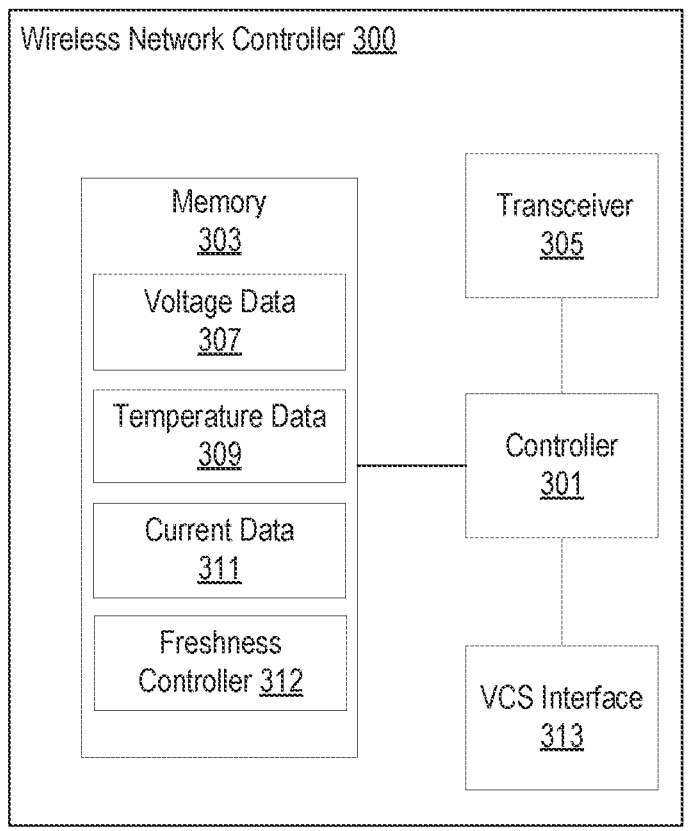
FIG. 3 illustrates a block diagram of a wireless network controller for functional safety in a battery management system according to at least one embodiment of the present invention.

For further explanation, FIG. 3 sets forth a block diagram of a wireless network controller (WNC) (300) (e.g., a wireless network controller (114) of FIG. 1) for use in a wireless sensor network having a secure wireless protocol according to at least one embodiment of the present invention. The WNC (300) includes a controller (301) coupled to a memory (303). The controller (301) is configured to request and receive, via a transceiver (305) from a plurality of MMSs (200), sensor data (e.g., voltage data (307), temperature data (309), current data (311)). The controller (301) may include or implement a microcontroller, an Application Specific Integrated Circuit (ASIC), a digital signal processor (DSP), a programmable logic array (PLA) such as a field programmable gate array (FPGA), or other data computation unit in accordance with the present disclosure. The battery sensor data (e.g., voltage data (307), temperature data (309), current data (311)) may be stored in the memory (303). The memory (303) may be a non-volatile memory such as flash memory. The controller (301) is further configured to provide formatted battery sensor data to a BMS controller (e.g., a BMS controller (412) of FIG. 6) or a vehicle control system (e.g., a VCS (112) of FIG. 1) via an interface (313). The interface may include a bus or other wired connection to a BMS controller or VCS.

In the example of FIG. 3, the memory (303) includes a freshness controller (312) that includes computer program instructions that when executed by the controller (301) cause the controller (301) to perform the operations of: receiving from a module monitoring system (MMS) of the battery management system, a message that includes a first set of data type blocks; determining, for the first set of data type blocks, a block sequence order that indicates a position of each data type block within the message; determining whether the message conforms with a predetermined block sequence protocol; and in response to determining that the message does not conform with a predetermined block sequence protocol, determining that data within the message is stale.

Figure 9:
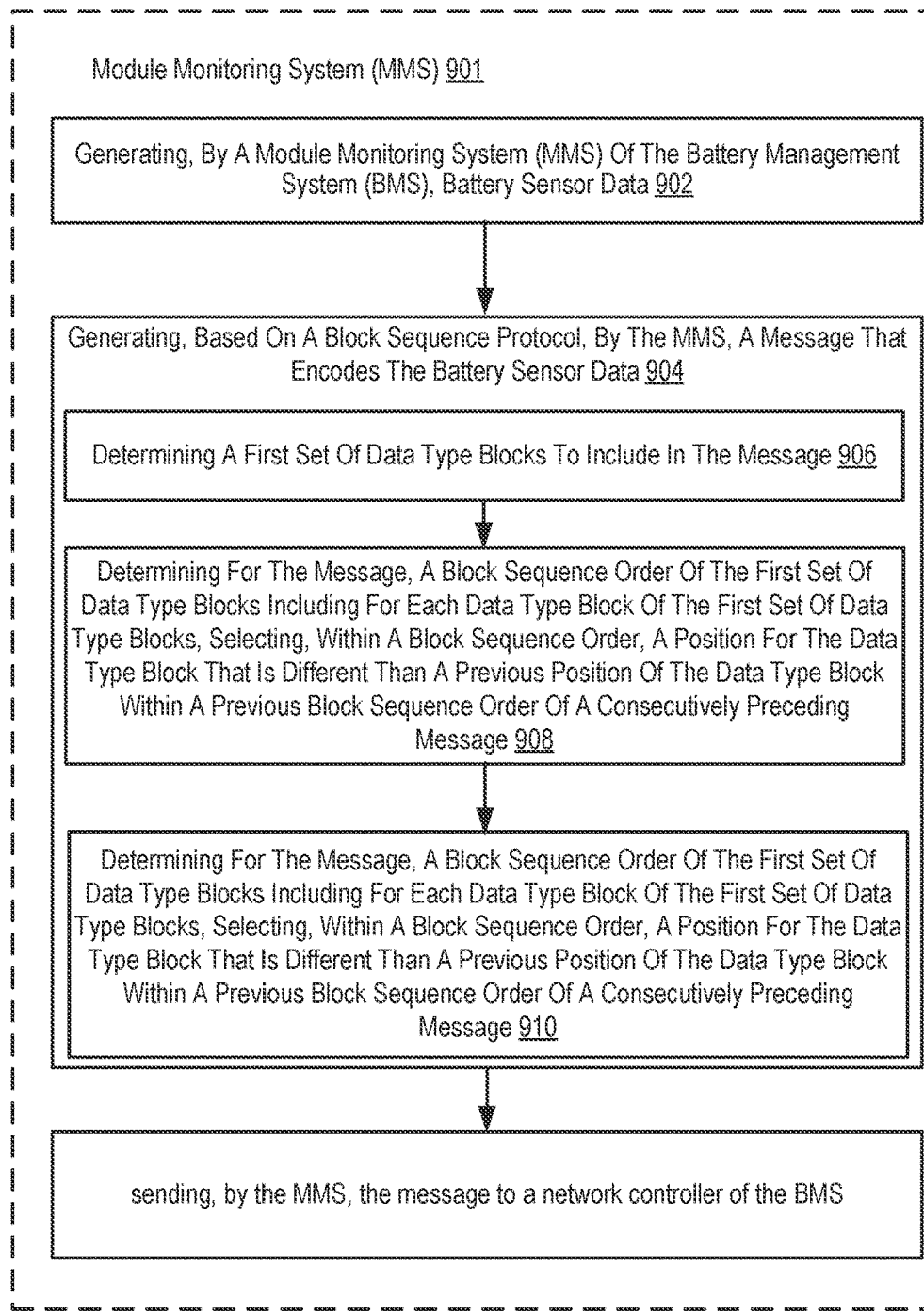
FIG. 9 is a flowchart to illustrate an implementation of a method for functional safety in a battery management system in accordance with the present disclosure.

For further explanation, FIG. 9 sets forth a flowchart to illustrate an implementation of a method for functional safety in a battery management system in accordance with the present disclosure. The method of FIG. 9 includes generating (902), by a module monitoring system (MMS) (901) of the battery management system (BMS), battery sensor data. According to embodiments of the present invention, a battery management system may be wireless or wired. As explained above, an MMS may be configured to monitor a corresponding module of battery cells. For example, each module may have an MMS attached to a chassis, base, tray, or other mechanism for holding the battery cells of the module. In a particular embodiment, each MMS includes an Analog Front End (AFE) to measure various attributes of the cells of its corresponding module. Such attributes may include voltage, current, temperature, and potentially other attributes. The attributes may be indicated in battery sensor data generated by the MMS. Generating (902), by a module monitoring system (MMS) (901) of the battery management system (BMS), battery sensor data may be carried out by monitoring and measuring attributes of battery cells and using the measured attributed to generate battery sensor data.

The method of FIG. 9 also includes generating (904), based on a block sequence protocol, by the MMS (901), a message that encodes the battery sensor data. A block sequence protocol is a data structure that defines a pattern, order, or otherwise sequence in which data type blocks within the message are arranged. A message may include a plurality of different types of data (e.g., Slow Data, Fast Data, Diagnostic Data, Fault Data, Status Data, etc.). Each of these different types of data may be encoded within the message as a specific type of data type block.

In a particular embodiment, the block sequence protocol may indicate a specific repetition interval for including a particular type of data block within any messages. For example, the block sequence protocol may indicate that the Fast Data type of data type blocks should be included in every message and the Slow Data type of data type blocks should be included in every four messages. In another particular embodiment, the block sequence protocol may indicate a specific position order of data type blocks for messages. For example, the block sequence protocol may indicate that a particular order is: Fast Data in the first position, Status data in the second position, Slow data in the third position, Slow Diagnostic data in the fourth position, and Faults data in the fifth position of a first message Continuing with this example, the order may continue for a second message with Faults data in the first position, Fast data in the second position, Fast diagnostic data in the third position, other data in the fourth position, and status data in the fifth position. In a particular embodiment, the "position" of the data within an order may be more specific and define start and stop location addresses within a message, offsets, and others as will occur to those of skill in the art. Generating (904), based on a block sequence protocol, by the MMS (901), a message that encodes the battery sensor data may be carried out by examining the block sequence protocol to determine a block sequence order for the particular message. A block sequence order for a particular message is the order in which each data type block is positioned within a particular message. For example, a block sequence order may indicate that a first type of data type block is in a first position within the message, a second type of data type block is in a second position, and a third type of data type block is in a third position.

In the method of FIG. 9, generating (904), based on a block sequence protocol, by the MMS (901), a message that encodes the battery sensor data includes determining (906) a first set of data type blocks to include in the message. A data type block is a block of data of a particular data type. The types of block of data that are included in the messages sent from an MMS to a network controller may depend on the type of hardware and software used for components of a battery management system; and the communication protocols used by those components. For example, in a particular protocol, messages from the MMS to the network controller may include types of data type blocks, such as Status Data, Fast Data, Slow Data, Fault Data, Fast Diagnostic Data, Slow Diagnostic Data, Other Data, Other Data 2. Determining (906) a first set of data type blocks to include in the message may be carried out by determining which types of data blocks should be included in the message.

In the method of FIG. 9, generating (904), based on a block sequence protocol, by the MMS (901), a message that encodes the battery sensor data includes determining (908) for the message, a block sequence order of the first set of data type blocks including for each data type block of the first set of data type blocks, selecting, within a block sequence order, a position for the data type block that is different than a previous position of the data type block within a previous block sequence order of a consecutively preceding message. Determining (908) for the message, a block sequence order of the first set of data type blocks including for each data type block of the first set of data type blocks, selecting, within a block sequence order, a position for the data type block that is different than a previous position of the data type block within a previous block sequence order of a consecutively preceding message may be carried out by examining the block sequence protocol to determine which position a particular data type block should be placed within the message. In addition, a series of counters and registers may be utilized to track, store, and record which types of data type blocks are to be included in a message; the previous position of types of data type blocks; messages sent since the type of data type block was included in a message; and others as will occur to those of skill in the art.

In addition, generating (904), based on a block sequence protocol, by the MMS (901), a message that encodes the battery sensor data includes generating (910) the message with each data type block of the first set of data type blocks positioned according to its selected position within the determined block sequence order. Generating (910) the message with each data type block of the first set of data type blocks positioned according to its selected position within the determined block sequence order may be carried out by placing the data type blocks within a to-be-sent-queue in accordance with the determined block sequence order.

Furthermore, generating (904), based on a block sequence protocol, by the MMS (901), a message that encodes the battery sensor data includes sending (912), by the MMS (901), the message to a network controller of the BMS. Sending (912), by the MMS (901), the message to a network controller of the BMS may be carried out by transmitting via a wired or wireless interface, a signal that includes the message.

Figure 10:
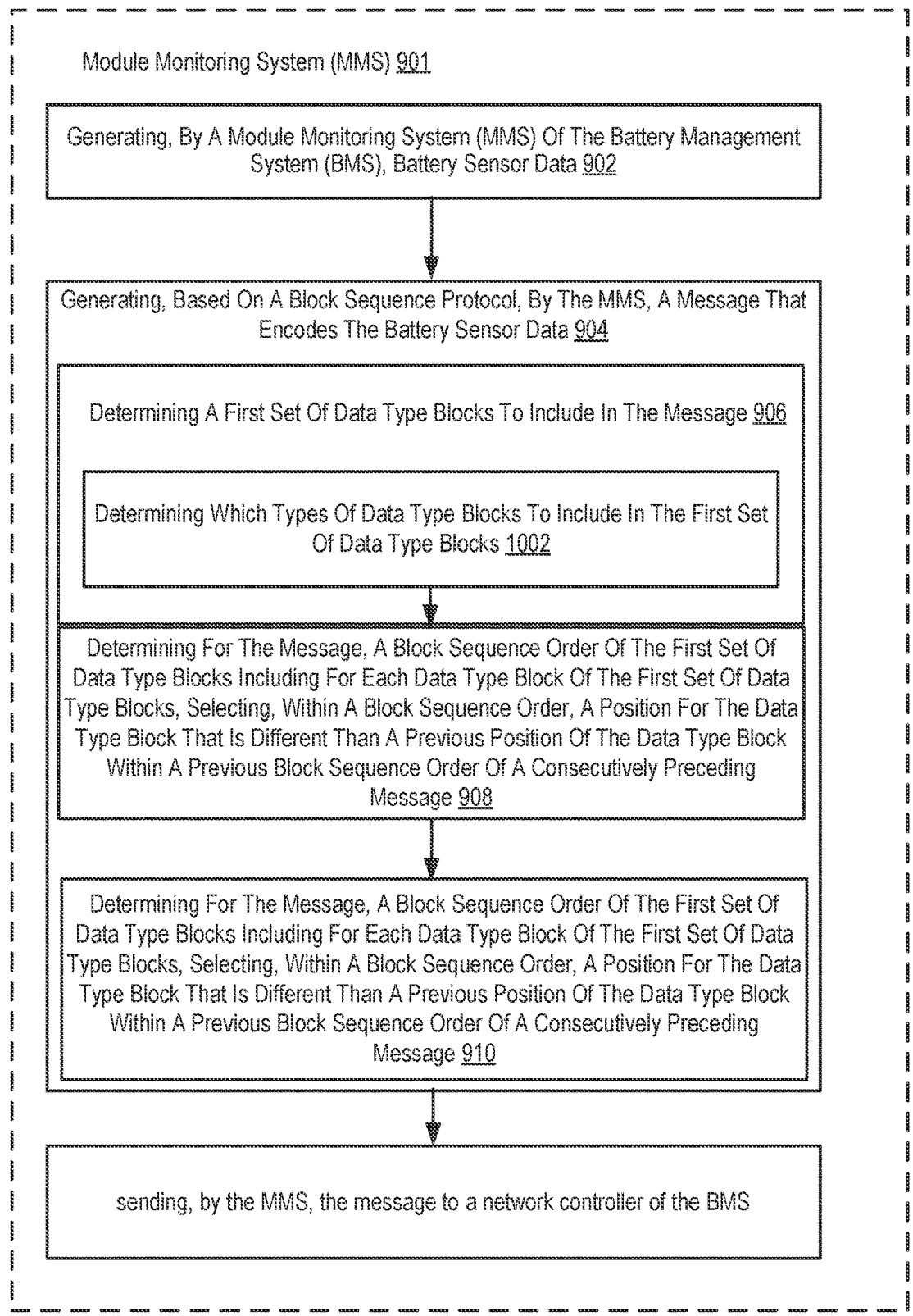
FIG. 10 is a flowchart to illustrate an implementation of a method for functional safety in a battery management system in accordance with the present disclosure.

For further explanation, FIG. 10 sets forth a flowchart to illustrate an implementation of a method for functional safety in a battery management system in accordance with the present disclosure. The method of FIG. 10 is similar to the method of FIG. 9 in that the method of FIG. 10 also includes generating (902), by the MMS (901) of the battery management system (BMS), battery sensor data; generating (904), based on a block sequence protocol, by the MMS (901), a message that encodes the battery sensor data including: determining (906) a first set of data type blocks to include in the message; determining (908) for the message, a block sequence order of the first set of data type blocks including for each data type block of the first set of data type blocks, selecting, within a block sequence order, a position for the data type block that is different than a previous position of the data type block within a previous block sequence order of a consecutively preceding message; and generating (910) the message with each data type block of the first set of data type blocks positioned according to its selected position within the determined block sequence order; and sending (912), by the MMS (901), the message to a network controller of the BMS.

In the method of FIG. 10, determining (906) a first set of data type blocks to include in the message includes determining (1002) which types of data type blocks to include in the first set of data type blocks. Determining (1002) which types of data type blocks to include in the first set of data type blocks may be carried out by examining the block sequence protocol to determine a specific repetition interval for including a particular type of data block within any messages and determining a specific position order of data type blocks for the message. In a particular embodiment, a series of registers and counters may be used to track, store, and record which types of data type blocks are to be included in a message; the previous position of types of data type blocks; messages sent since the type of data type block was included in a message; and others as will occur to those of skill in the art.

Figure 11:
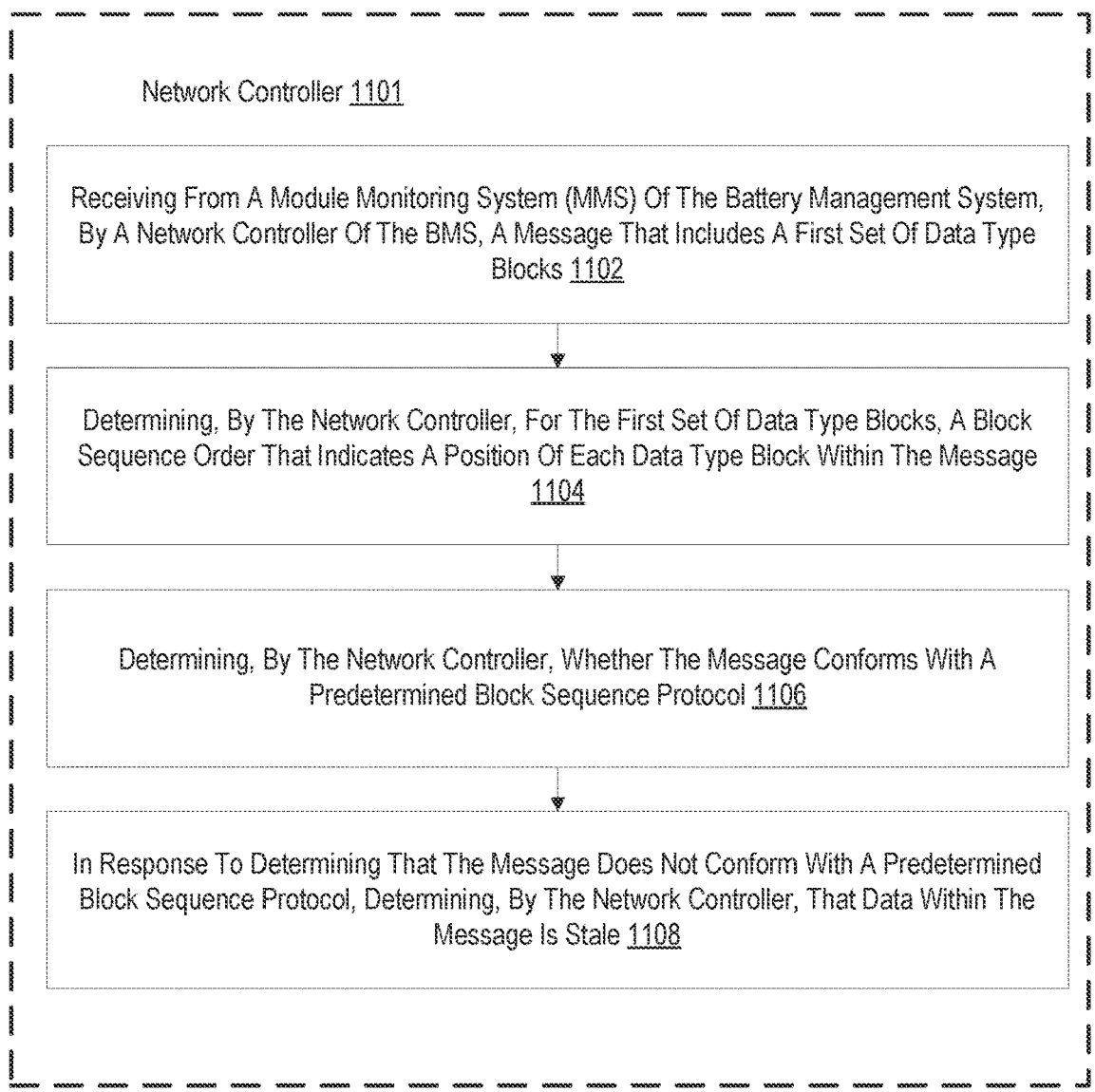
FIG. 11 is a flowchart to illustrate an implementation of a method for functional safety in a battery management system in accordance with the present disclosure.

For further explanation, FIG. 11 sets forth a flowchart to illustrate an implementation of a method for functional safety in a battery management system in accordance with the present disclosure. The method of FIG. 11 includes receiving (1102) from a module monitoring system (MMS) of the battery management system, by a network controller (1101) of the BMS, a message that includes a first set of data type blocks. Receiving (1102) from a module monitoring system (MMS) of the battery management system, by a network controller (1101) of the BMS, a message that includes a first set of data type blocks may be carried out by receiving via a wired or wireless interface, a signal that encodes the message containing the first set of data type blocks.

The method of FIG. 11 also includes determining (1104), by the network controller (1101), for the first set of data type blocks, a block sequence order that indicates a position of each data type block within the message. As explained above, a block sequence order for a particular message is the order in which each data type block is positioned within a particular message. For example, a block sequence order may indicate that a first type of data type block is in a first position within the message, a second type of data type block is in a second position, and a third type of data type block is in a third position. Determining (1104), by the network controller (1101), for the first set of data type blocks, a block sequence order that indicates a position of each data type block within the message may be carried out by determining an identification for each data type block; and determining position information (e.g., an address, offset, byte count, etc.) that indicates the position for each data type block.

In addition, the method of FIG. 11 also includes determining (1106), by the network controller (1101), whether the message conforms with a predetermined block sequence protocol. A block sequence protocol is a data structure that defines a pattern, order, or otherwise sequence in which data type blocks within the message are arranged. Determining (1106), by the network controller (1101), whether the message conforms with a predetermined block sequence protocol may be carried out by determining an expected block sequence order for the message based on the block sequence protocol and determining whether the block sequence order of the message matches the expected block sequence order. For example, an expected block sequence order may indicate that a Fast Data block is expected at a first position. In this example, if the block sequence order of the message indicates that the Slow data block is in the first position, then network controller may determine that the message does not conform with the predetermined block sequence protocol.

Furthermore, in response to determining that the message does not conform with a predetermined block sequence protocol, determining (1108), by the network controller (1101), that data within the message is stale. Determining (1108), by the network controller (1101), that data within the message is stale in response to determining that the message does not conform with a predetermined block sequence protocol may be carried out by storing an indication within the network controller that one or more data blocks in the message is stale. In a particular embodiment, the network controller may disregard the stale message and request updated information from the MMS. In other embodiments, the network controller may utilize the data even though it is stale.

Figure 12:
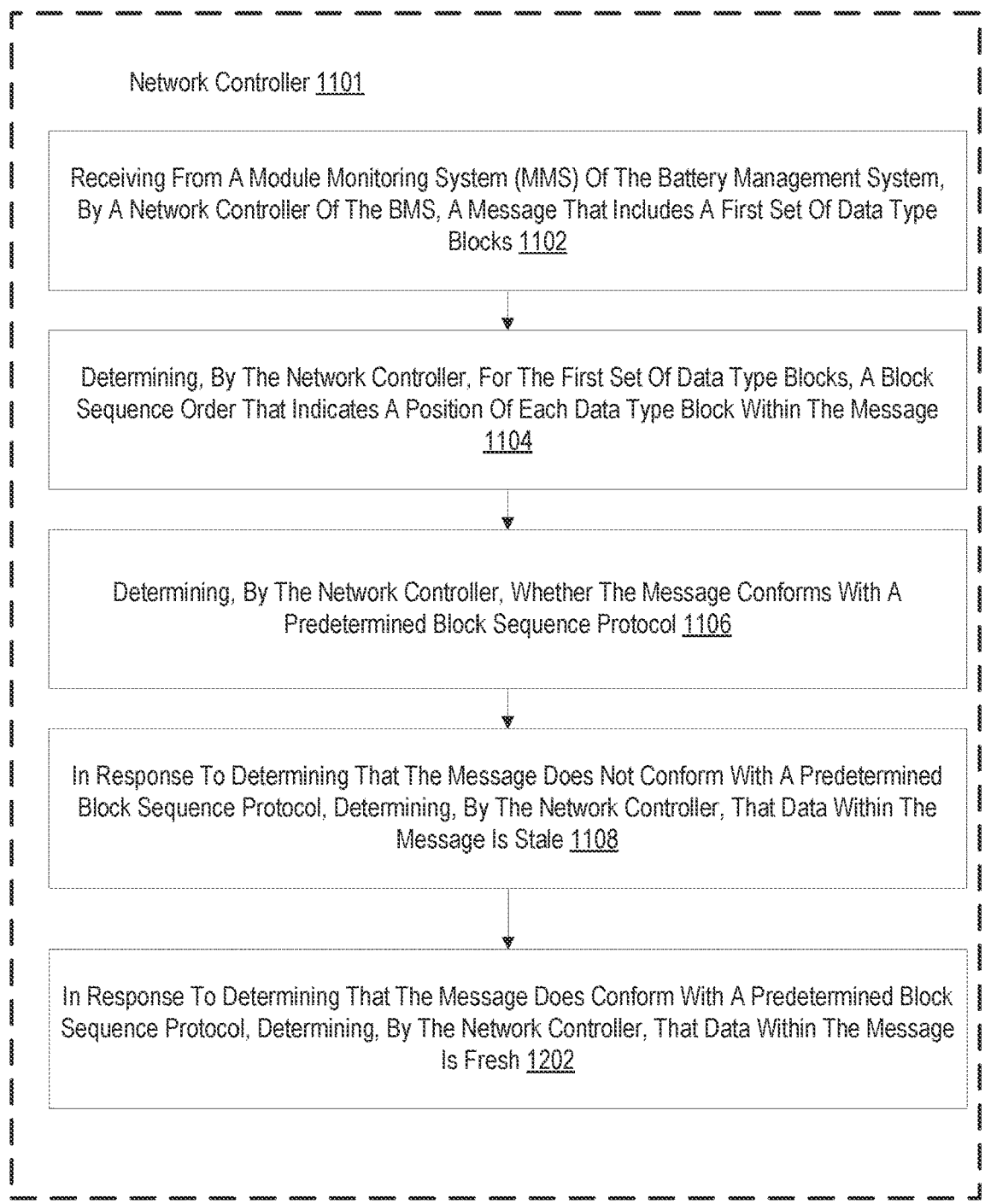
FIG. 12 is a flowchart to illustrate an implementation of a method for functional safety in a battery management system in accordance with the present disclosure.

For further explanation, FIG. 12 sets forth a flowchart to illustrate an implementation of a method for functional safety in a battery management system in accordance with the present disclosure. The method of FIG. 12 is similar to the method of FIG. 11 in that the method of FIG. 12 also includes: receiving (1102) from a module monitoring system (MMS) of the battery management system, by a network controller (1101) of the BMS, a message that includes a first set of data type blocks; determining (1104), by the network controller (1101), for the first set of data type blocks, a block sequence order that indicates a position of each data type block within the message; determining (1106), by the network controller (1101), whether the message conforms with a predetermined block sequence protocol; and in response to determining that the message does not conform with a predetermined block sequence protocol, determining (1108), by the network controller (1101), that data within the message is stale.

However, the method of FIG. 12 also includes in response to determining that the message does conform with a predetermined block sequence protocol, determining (1202), by the network controller (1101), that data within the message is fresh. Determining (1202), by the network controller (1101), that data within the message is fresh, in response to determining that the message does conform with a predetermined block sequence protocol may be carried out by storing an indication that the message is fresh. As explained above, in addition to confirming data freshness, the network controller may also confirm that device identity, data identify, and integrity of the message using CRC.

Figure 13:
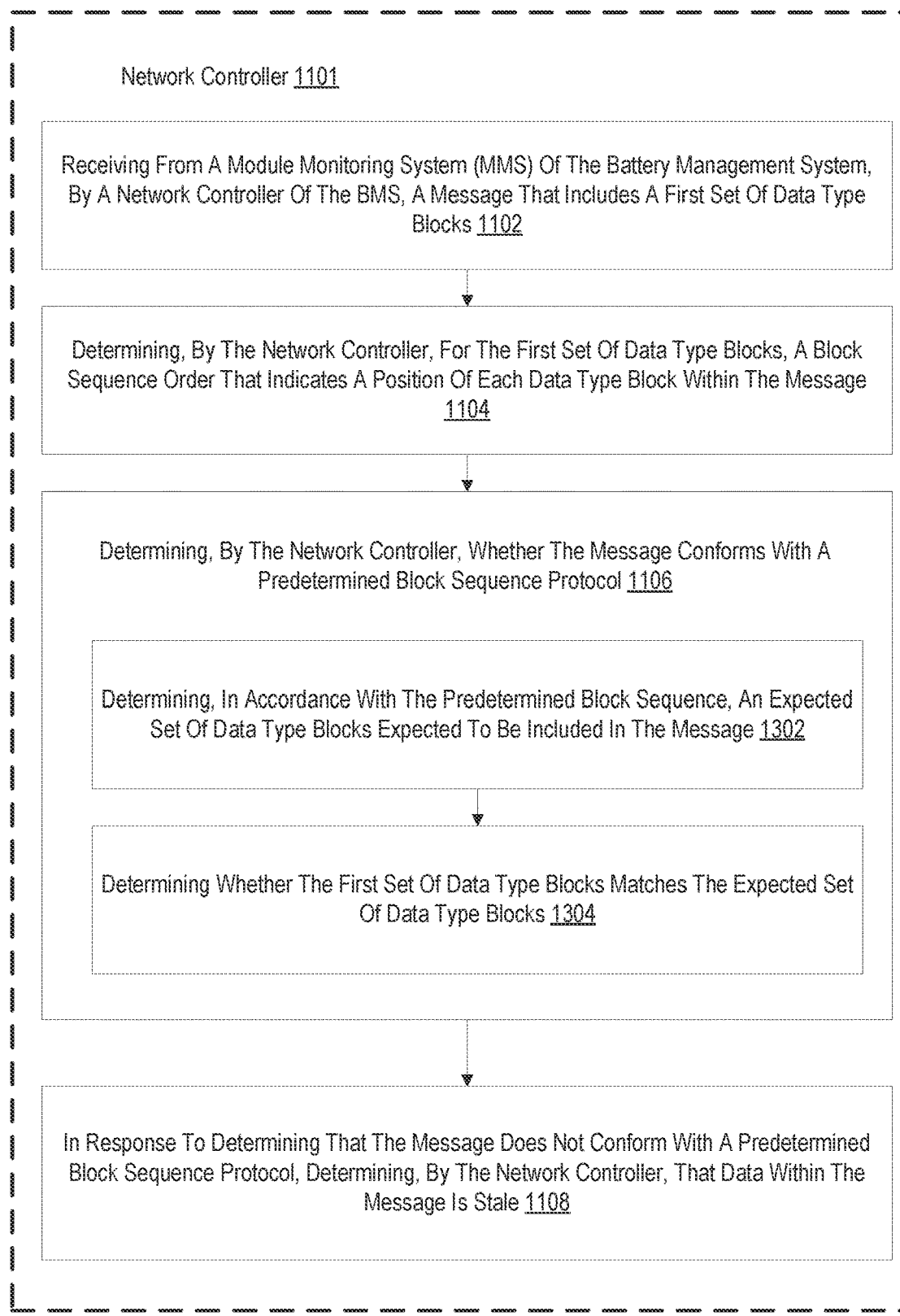
FIG. 13 is a flowchart to illustrate an implementation of a method for functional safety in a battery management system in accordance with the present disclosure.

For further explanation, FIG. 13 sets forth a flowchart to illustrate an implementation of a method for functional safety in a battery management system in accordance with the present disclosure. The method of FIG. 13 is similar to the method of FIG. 11 in that the method of FIG. 13 also includes: receiving (1102) from a module monitoring system (MMS) of the battery management system, by a network controller (1101) of the BMS, a message that includes a first set of data type blocks; determining (1104), by the network controller (1101), for the first set of data type blocks, a block sequence order that indicates a position of each data type block within the message; determining (1106), by the network controller (1101), whether the message conforms with a predetermined block sequence protocol; and in response to determining that the message does not conform with a predetermined block sequence protocol, determining (1108), by the network controller (1101), that data within the message is stale.

In the method of FIG. 13, determining (1106), by the network controller (1101), whether the message conforms with a predetermined block sequence protocol includes determining (1302), in accordance with the predetermined block sequence protocol, an expected set of data type blocks expected to be included in the message. Determining (1302), in accordance with the predetermined block sequence protocol, an expected set of data type blocks expected to be included in the message may be carried out by examining the predetermined block sequence protocol; reading a master order of data type blocks in the predetermined block sequence protocol; and utilizing registers and counters to determine the pattern for including a particular data type block in a message.

In addition, in the method of FIG. 13, determining (1106), by the network controller (1101), whether the message conforms with a predetermined block sequence protocol includes determining (1304) whether the first set of data type blocks matches the expected set of data type blocks. Determining (1304) whether the first set of data type blocks matches the expected set of data type blocks may be carried out by determining an expected set of data type blocks for a message; and comparing the expected set of data type blocks for the message to the first set of data type blocks received in the message. For example, an expected block sequence order may indicate that a Fast Data block is expected at a first position. In this example, if the block sequence order of the message indicates that the Slow data block is in the first position, then network controller may determine that the message does not conform with the predetermined block sequence protocol.

Figure 14:
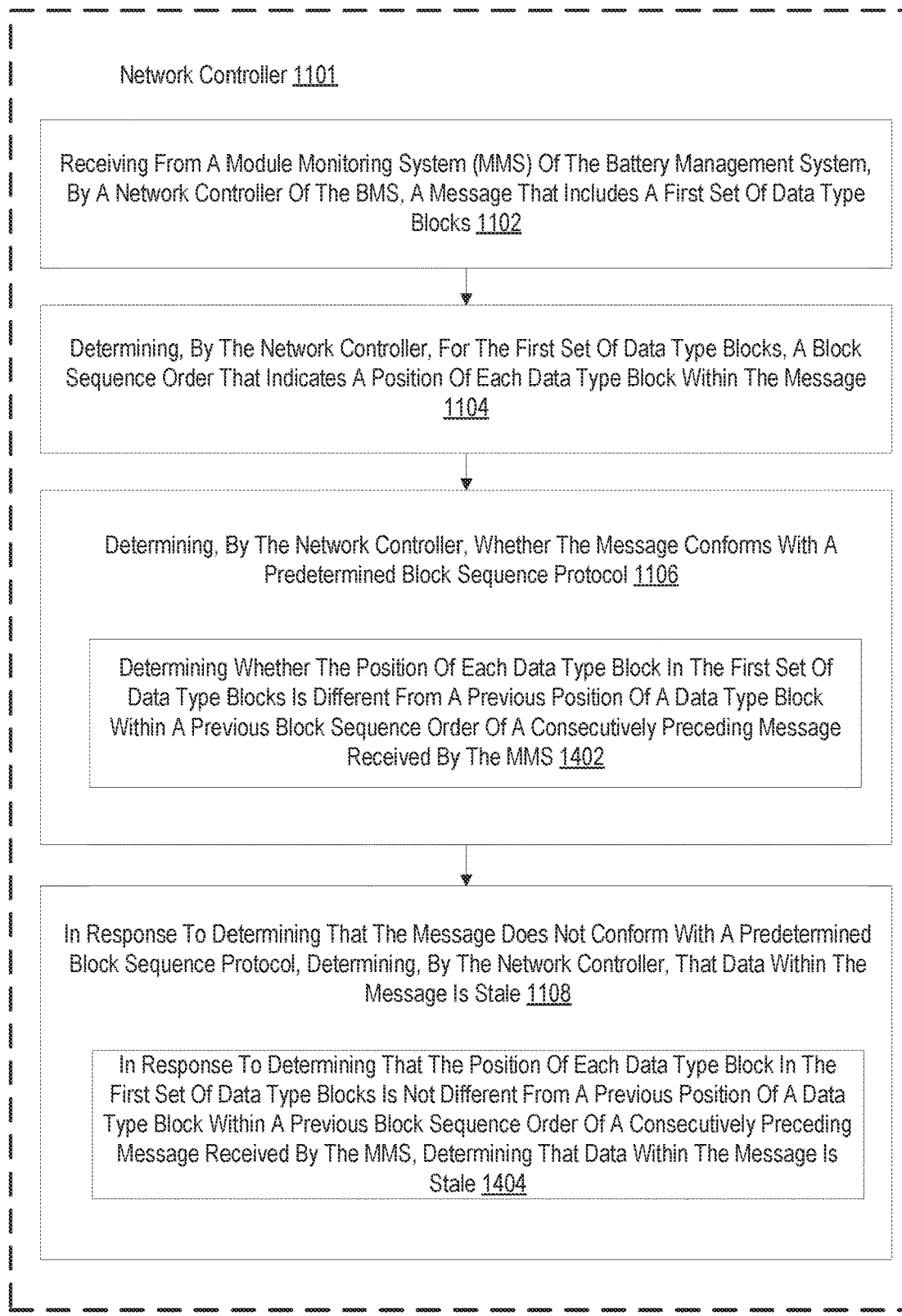
FIG. 14 is a flowchart to illustrate an implementation of a method for functional safety in a battery management system in accordance with the present disclosure.

For further explanation, FIG. 14 sets forth a flowchart to illustrate an implementation of a method for functional safety in a battery management system in accordance with the present disclosure. The method of FIG. 14 is similar to the method of FIG. 11 in that the method of FIG. 14 also includes: receiving (1102) from a module monitoring system (MMS) of the battery management system, by a network controller (1101) of the BMS, a message that includes a first set of data type blocks; determining (1104), by the network controller (1101), for the first set of data type blocks, a block sequence order that indicates a position of each data type block within the message; determining (1106), by the network controller (1101), whether the message conforms with a predetermined block sequence protocol; and in response to determining that the message does not conform with a predetermined block sequence protocol, determining (1108), by the network controller (1101), that data within the message is stale.

In the method of FIG. 14, determining (1106), by the network controller (1101), whether the message conforms with a predetermined block sequence protocol includes determining (1402) whether the position of each data type block in the first set of data type blocks is different from a previous position of a data type block within a previous block sequence order of a consecutively preceding message received by the MMS. In a particular embodiment, the "position" of the data within an order may be more specific and define start and stop location addresses within a message, offsets, and others as will occur to those of skill in the art. Determining (1402) whether the position of each data type block in the first set of data type blocks is different from a previous position of a data type block within a previous block sequence order of a consecutively preceding message received by the MMS may be carried out by storing and tracking the previous position; and comparing the previous position to the current position.

In the method of FIG. 14, determining (1108), by the network controller (1101), that data within the message is stale in response to determining that the message does not conform with a predetermined block sequence protocol includes in response to determining that the position of each data type block in the first set of data type blocks is not different from a previous position of a data type block within a previous block sequence order of a consecutively preceding message received by the MMS, determining (1404) that data within the message is stale. Determining (1404) that data within the message is stale in response to determining that the position of each data type block in the first set of data type blocks is not different from a previous position of a data type block within a previous block sequence order of a consecutively preceding message received by the MMS may be carried out by storing an indication that data within the message is stale. In a particular embodiment, the network controller may disregard the stale message and request updated information from the MMS. In other embodiments, the network controller may utilize the data even though it is stale.

One skilled in the art would appreciate that the approaches set forth herein to detect data freshness by shifting the order of data included in messages can be applied to both wired and wireless systems to improve black channel communication.

In view of the explanations set forth above, readers will recognize that the benefits of functional safety in a battery management system according to at least one embodiment of the present invention include, but are not limited to:

Improved performance of a module monitoring system by ensuring that the WNC can identify every MMS in the network by providing a device ID with every data frame.

Improved performance of a module monitoring system by ensuring the WNC can identify every data type (e.g., voltage, temperature, etc.) coming from identified MMS.

Improved performance of a module monitoring system by ensuring that the WNC can detect data corruption on every message by means of calculating and comparing a redundancy code (CRC).

Improved performance of a module monitoring system by ensuring that the AFE data is fresh by performing diagnostics internal to the AFE and reporting the status to the WNC.

Improved performance of a module monitoring system by ensuring the AFE data continues to be fresh as it passes through the wireless transceiver, by requesting AFE data with a specific order and repetition interval that can be checked by the WNC.

Improved performance of a module monitoring system by ensuring proper end-to-end protection of safety data between high safety-integrity components (the data generated by the AFE is communicated to the controller at the WNC without losing its safety integrity).

Improved performance of a module monitoring system by ensuring a more robust freshness mechanism on both wireless and wired systems.

Exemplary embodiments of the present invention are described largely in the context of a fully functional computer system for functional safety. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, an apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Advantages and features of the present disclosure can be further described by the following statements:

1. A method for functional safety in a battery management system, the method comprising: generating, by a module monitoring system (MMS) of the battery management system (BMS), battery sensor data; generating, based on a block sequence protocol, by the MMS, a message that encodes the battery sensor data including: determining a first set of data type blocks to include in the message; determining for the message, a block sequence order of the first set of data type blocks including for each data type block of the first set of data type blocks, selecting, within a block sequence order, a position for the data type block that is different than a previous position of the data type block within a previous block sequence order of a consecutively preceding message; and generating the message with each data type block of the first set of data type blocks positioned according to its selected position within the determined block sequence order; and sending, by the MMS, the message to a network controller of the BMS.

2. The method of statement 1 wherein determining a first set of data type blocks to include in the message includes determining which types of data type blocks to include in the first set of data type blocks.

3. The method of statement 1 or 2, wherein the block sequence protocol indicates a specific repetition interval for including a particular type of data block within any messages.

4. The method of any of statements 1-3, wherein the block sequence protocol indicates a specific position order of data type blocks for messages.

5. The method of any of statements 1-4, wherein the first set of data type blocks includes data integrity data.

6. The method of any of statements 1-5, wherein the first set of data type blocks includes an identification of the MMS and an identification of one or more of the data type blocks of the first set of data type blocks.

7. A method for functional safety in a battery management system, the method comprising: receiving from a module monitoring system (MMS) of the battery management system, by a network controller of the BMS, a message that includes a first set of data type blocks; determining, by the network controller, for the first set of data type blocks, a block sequence order that indicates a position of each data type block within the message; determining, by the network controller, whether the message conforms with a predetermined block sequence protocol; and in response to determining that the message does not conform with a predetermined block sequence protocol, determining, by the network controller, that data within the message is stale.

8. The method of any of statements 1-7.

9. The method of any of statements 1-8, further comprising in response to determining that the message does conform with a predetermined block sequence protocol, determining, by the network controller, that data within the message is fresh.

10. The method of any of statements 1-9, wherein determining, by the network controller, whether the message conforms with a predetermined block sequence protocol includes: determining, in accordance with the predetermined block sequence protocol, an expected set of data type blocks expected to be included in the message; and determining whether the first set of data type blocks matches the expected set of data type blocks.

11. The method of any of statements 1-10, wherein determining, by the network controller, whether the message conforms with a predetermined block sequence protocol includes: determining whether the position of each data type block in the first set of data type blocks is different from a previous position of a data type block within a previous block sequence order of a consecutively preceding message received by the MMS; and wherein in response to determining that the message does not conform with a predetermined block sequence protocol, determining that data within the message is stale includes in response to determining that the position of each data type block in the first set of data type blocks is not different from a previous position of a data type block within a previous block sequence order of a consecutively preceding message received by the MMS, determining that data within the message is stale.

12. The method of any of statements 1-11, wherein the block sequence protocol indicates a specific repetition interval for including a particular type of data block within any messages.

13. The method of any of statements 1-12, wherein the block sequence protocol indicates a specific position order of data type blocks for messages.

14. The method of any of statements 1-13, wherein the first set of data type blocks includes data integrity data.

15. The method of any of statements 1-14, wherein the first set of data type blocks includes an identification of the MMS and an identification of one or more of the data type blocks of the first set of data type blocks.

16. An apparatus for functional safety in a battery management system, the apparatus including a module monitoring system (MMS) of the battery management system (BMS), the MMS including: a processor; memory coupled to the processor, the memory including computer program instructions that when executed by the processor cause the MMS to perform the operations of: generating battery sensor data; generating, based on a block sequence protocol, a message that encodes the battery sensor data including: determining a first set of data type blocks to include in the message; determining for the message, a block sequence order of the first set of data type blocks including for each data type block of the first set of data type blocks, selecting, within a block sequence order, a position for the data type block that is different than a previous position of the data type block within a previous block sequence order of a consecutively preceding message; and generating the message with each data type block of the first set of data type blocks positioned according to its selected position within the determined block sequence order; and sending the message to a network controller of the BMS.

17. The apparatus of statement 16, wherein determining a first set of data type blocks to include in the message includes determining which types of data type blocks to include in the first set of data type blocks.

18. The apparatus of statement 16 or 17, wherein the block sequence protocol indicates a specific repetition interval for including a particular type of data block within any messages.

19. The apparatus of any of statements 16-18, wherein the block sequence protocol indicates a specific position order of data type blocks for messages.

20. The apparatus of any of statements 16-19, wherein the first set of data type blocks includes data integrity data.

21. The apparatus of any of statements 16-20, wherein the first set of data type blocks includes an identification of the MMS and an identification of one or more of the data type blocks of the first set of data type blocks.

22. An apparatus for functional safety in a battery management system, the apparatus including a network controller of the battery management system (BMS), the network controller including: a processor; memory coupled to the processor, the memory including computer program instructions that when executed by the processor cause the network controller to perform the operations of: receiving from a module monitoring system (MMS) of the battery management system, by a network controller of the BMS, a message that includes a first set of data type blocks; determining, by the network controller, for the first set of data type blocks, a block sequence order that indicates a position of each data type block within the message; determining, by the network controller, whether the message conforms with a predetermined block sequence protocol; and in response to determining that the message does not conform with a predetermined block sequence protocol, determining, by the network controller, that data within the message is stale.

23. The apparatus of any of statements 16-22.

24. The apparatus of any of statements 16-23, further comprising in response to determining that the message does conform with a predetermined block sequence protocol, determining, by the network controller, that data within the message is fresh.

25. The apparatus of any of statements 16-24, wherein determining, by the network controller, whether the message conforms with a predetermined block sequence protocol includes: determining, in accordance with the predetermined block sequence protocol, an expected set of data type blocks expected to be included in the message; and determining whether the first set of data type blocks matches the expected set of data type blocks.

26. The apparatus of any of statements 16-25, wherein determining, by the network controller, whether the message conforms with a predetermined block sequence protocol includes: determining whether the position of each data type block in the first set of data type blocks is different from a previous position of a data type block within a previous block sequence order of a consecutively preceding message received by the MMS; and wherein in response to determining that the message does not conform with a predetermined block sequence protocol, determining that data within the message is stale includes in response to determining that the position of each data type block in the first set of data type blocks is not different from a previous position of a data type block within a previous block sequence order of a consecutively preceding message received by the MMS, determining that data within the message is stale.

27. The apparatus of any of statements 16-26, wherein the block sequence protocol indicates a specific repetition interval for including a particular type of data block within any messages.

28. The apparatus of any of statements 16-27, wherein the block sequence protocol indicates a specific position order of data type blocks for messages.

29. The apparatus of any of statements 16-28, wherein the first set of data type blocks includes data integrity data.

30. The apparatus of any of statements 16-29, wherein the first set of data type blocks includes an identification of the MMS and an identification of one or more of the data type blocks of the first set of data type blocks.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method for functional safety in a battery management system, the method comprising:
    generating, by a module monitoring system (MMS) of the battery management system (BMS), battery sensor data;
    generating, based on a block sequence protocol, by the MMS, a message that encodes the battery sensor data including:
        determining a first set of data type blocks to include in the message;
        determining for the message, a block sequence order of the first set of data type blocks including for each data type block of the first set of data type blocks, selecting, within the block sequence order, a position for the data type block that is different than a previous position of the data type block within a previous block sequence order of a consecutively preceding message; and
        generating the message with each data type block of the first set of data type blocks positioned according to its selected position within the determined block sequence order; and
    sending, by the MMS, the message to a network controller of the BMS.

2. The method of claim 1 wherein determining a first set of data type blocks to include in the message includes determining which types of data type blocks to include in the first set of data type blocks.

3. The method of claim 1 wherein the block sequence protocol indicates a specific repetition interval for including a particular type of data block within any messages.

4. The method of claim 1 wherein the block sequence protocol indicates a specific position order of data type blocks for messages.

5. The method of claim 1 wherein the first set of data type blocks includes data integrity data.

6. The method of claim 1 wherein the first set of data type blocks includes an identification of the MMS and an identification of one or more of the data type blocks of the first set of data type blocks.

7. A method for functional safety in a battery management system, the method comprising:
    receiving from a module monitoring system (MMS) of the battery management system, by a network controller of the BMS, a message that includes a first set of data type blocks;
    determining, by the network controller, for the first set of data type blocks, a block sequence order that indicates a position of each data type block within the message;
    determining, by the network controller, whether the message conforms with a predetermined block sequence protocol; and
    in response to determining that the message does not conform with a predetermined block sequence protocol, determining, by the network controller, that data within the message is stale.

8. The method of claim 7 further comprising in response to determining that the message does conform with a predetermined block sequence protocol, determining, by the network controller, that data within the message is fresh.

9. The method of claim 7, wherein determining, by the network controller, whether the message conforms with a predetermined block sequence protocol includes:
    determining, in accordance with the predetermined block sequence protocol, an expected set of data type blocks expected to be included in the message; and
    determining whether the first set of data type blocks matches the expected set of data type blocks.

10. The method of claim 7, wherein determining, by the network controller, whether the message conforms with a predetermined block sequence protocol includes:
    determining whether the position of each data type block in the first set of data type blocks is different from a previous position of a data type block within a previous block sequence order of a consecutively preceding message received by the MMS; and
    wherein in response to determining that the message does not conform with a predetermined block sequence protocol, determining that data within the message is stale includes in response to determining that the position of each data type block in the first set of data type blocks is not different from a previous position of a data type block within a previous block sequence order of a consecutively preceding message received by the MMS, determining that data within the message is stale.

11. The method of claim 7 wherein the block sequence protocol indicates a specific repetition interval for including a particular type of data block within any messages.

12. The method of claim 7 wherein the block sequence protocol indicates a specific position order of data type blocks for messages.

13. The method of claim 7 wherein the first set of data type blocks includes data integrity data.

14. The method of claim 7 wherein the first set of data type blocks includes an identification of the MMS and an identification of one or more of the data type blocks of the first set of data type blocks.

15. An apparatus for functional safety in a battery management system, the apparatus including a module monitoring system (MMS) of the battery management system (BMS), the MMS including:
    a processor;
    memory coupled to the processor, the memory including computer program instructions that when executed by the processor cause the MMS to perform the operations of:
    generating battery sensor data;
    generating, based on a block sequence protocol, a message that encodes the battery sensor data including:
        determining a first set of data type blocks to include in the message;
        determining for the message, a block sequence order of the first set of data type blocks including for each data type block of the first set of data type blocks, selecting, within the block sequence order, a position for the data type block that is different than a previous position of the data type block within a previous block sequence order of a consecutively preceding message; and generating the message with each data type block of the first set of data type blocks positioned according to its selected position within the determined block sequence order; and sending the message to a network controller of the BMS.

16. The apparatus of claim 15 wherein determining a first set of data type blocks to include in the message includes determining which types of data type blocks to include in the first set of data type blocks.

17. The apparatus of claim 15 wherein the block sequence protocol indicates a specific repetition interval for including a particular type of data block within any messages.

18. The apparatus of claim 15 wherein the block sequence protocol indicates a specific position order of data type blocks for messages.

19. The apparatus of claim 15 wherein the first set of data type blocks includes data integrity data.

20. The apparatus of claim 15 wherein the first set of data type blocks includes an identification of the MMS and an identification of one or more of the data type blocks of the first set of data type blocks.

\* \* \* \* \*